Nov. 9, 1943.　　　A. G. SCHNEIDER　　　2,333,681
PLANETARY TURBINE TRANSMISSION
Filed Dec. 26, 1941
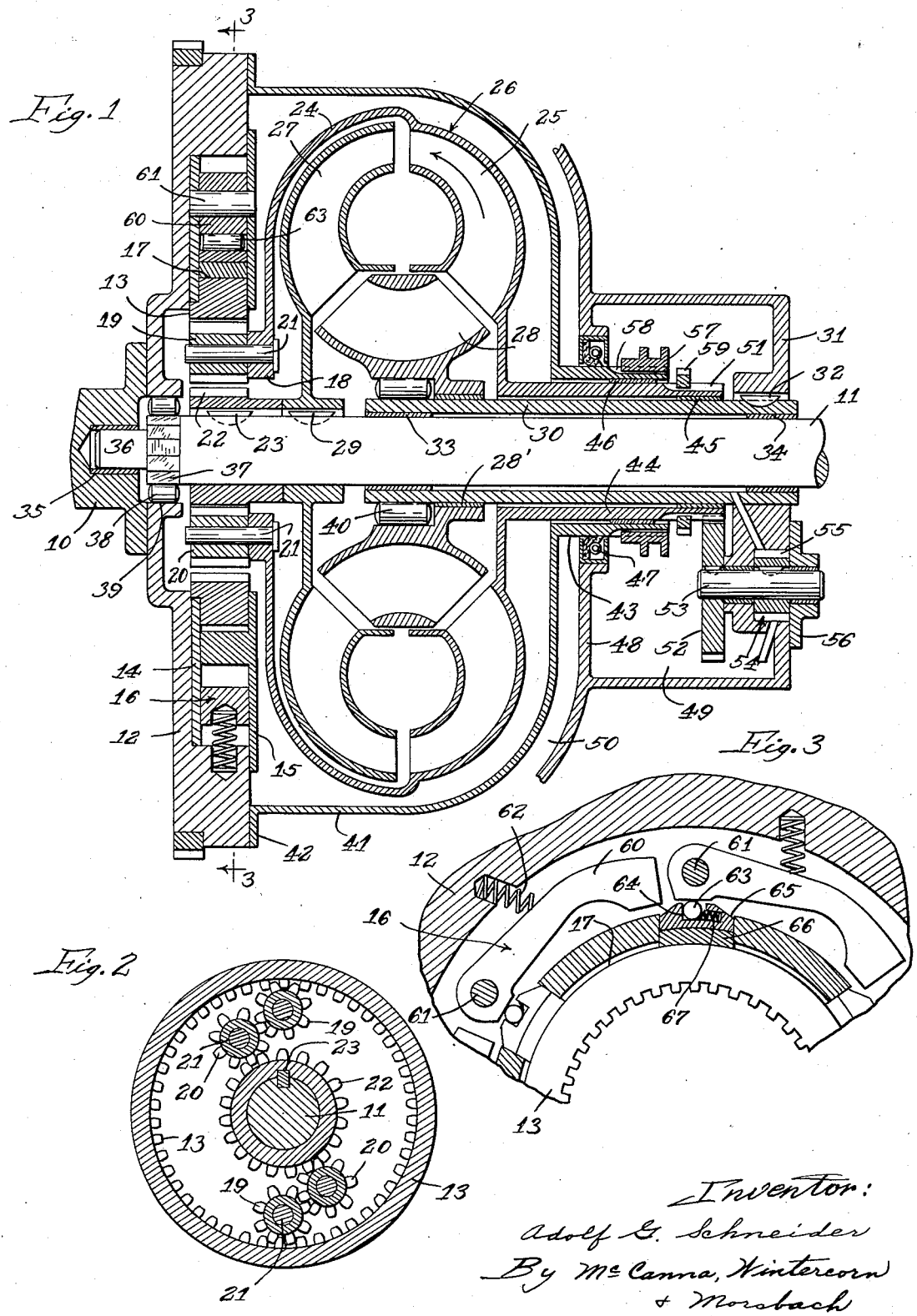
Inventor:
Adolf G. Schneider
By McCanna, Wintercorn
& Morsbach
Attys.

Patented Nov. 9, 1943

2,333,681

UNITED STATES PATENT OFFICE 2,333,681

PLANETARY TURBINE TRANSMISSION

Adolf G. Schneider, Muncie, Ind., assignor, by mesne assignments, to Schneider Brothers Company, a copartnership composed of Heinrich Schneider and Viva Schneider, both of Hamilton, Ohio, and Adolf G. Schneider and Erna Schneider, both of Muncie, Ind.

Application December 26, 1941, Serial No. 424,463

18 Claims. (Cl. 74—189.5)

This invention relates to hydraulic transmissions of the Föttinger turbine type and is more particularly concerned with a differential transmission, the present transmission being an improvement on that disclosed in Patent 2,224,884 to Heinrich Schneider and myself, issued December 17, 1940.

It is the principal object of my invention to provide a transmission of the kind mentioned of a more compact and simplified construction, in which the primary drive is again formed by a planetary gear set having dual planetary pinions so as to turn the pump impeller and the turbine wheel in the same direction as the driving shaft and accordingly obviate the necessity for a reversal in the direction of fluid flow by the reaction member. In accordance with my invention, the connection between the converter and the planetary gear set is changed so as to obtain a smaller and more compact unit, the sun gear being keyed directly to the turbine shaft or a part integral or turning therewith instead of being provided in a sleeve surrounding such shaft, this change permitting the use of a sun gear of smaller diameter and permitting proportionate reduction in the diameter of the whole planetary gear set.

Other objects of the invention, as hereinafter pointed out, deal with other improvements to simplify the construction and further increase the efficiency of operation, namely:

(a) The provision of a shell projecting rearwardly from and turning with the flywheel enclosing the converter, planetary gear set, and centrifugal clutch to keep the whole assembly operating in oil under pressure to insure the best possible lubrication for the gears and at the same time reduce gear noise;

(b) The provision of a roller clutch between the turbine shaft and the driving shaft to permit use of the engine as a brake when coasting down hill and save wear and tear on the converter and centrifugal clutch in coasting against the engine;

(c) The provision of an oil pump behind the converter for supplying oil to the converter, driven from the pump impeller so that at starting the oil pump is turned at a higher R. P. M. than the engine, but at high car speed the oil pump is turned at approximately the same speed as the engine, thus permitting a reduction in the size of the oil pump and requiring minimum power to drive it, and (d) The provision of a clutch for detachably connecting the pump impeller with the flywheel for direct drive, this clutch being provided behind the converter and serving to lock the planetary gear set so that the entire assembly turns as a unit with the flywheel.

The invention is hereinafter described by reference to the accompanying drawing, in which—

Figure 1 is a central longitudinal section through a transmission made in accordance with my invention;

Fig. 2 is a cross-section through the dual planetary gear set, and

Fig. 3 is a cross-section through the centrifugal clutch.

The same reference numerals are applied to corresponding parts throughout the views.

Referring mainly to Figure 1, the reference numeral 10 designates the driving shaft, as, for example, the crank-shaft of an internal combustion engine, and the reference numeral 11 designates the driven turbine shaft, which may be connected with the propeller shaft of an automobile or other vehicle. 12 is a flywheel carried on the end of the shaft 10, and 13 is a ring gear rotatably mounted on the flywheel on plates 14 and 15, which, in turn, are suitably secured to the flywheel. An automatic centrifugal clutch, indicated generally by the reference numeral 16, is provided between the plates 14 and 15 for quickly releasably gripping the ring gear 13 at its periphery 17 to turn with the flywheel at a certain speed of the engine. The clutch 16 is like that disclosed in the copending application of Heinrich Schneider and myself, Serial No. 196,874, filed March 19, 1938, and is clearly illustrated in Fig. 3. A planetary cage 18 carries pairs of intermeshed planetary gears 19 and 20 on pins 21, the gears 19 meshing with the ring gear 13 and the gears 20 meshing with a sun gear 22. The latter is keyed, as indicated at 23, on the turbine shaft 11. The cage 18 for the planetary gears is connected, as shown at 24, with the pump impeller 25 of the converter 26. The converter also includes a turbine wheel 27 and a reaction member 28. The turbine wheel is keyed to the shaft 11, as indicated at 29. The reaction member 28 is rotatably mounted on the front end of a sleeve 30 which is supported at its rear end in a housing 31 and keyed, as indicated at 32, against rotation. Bearings 33 and 34 in the opposite ends of the sleeve receive the shaft 11, and there is a pilot bearing 35 for the reduced front end of the shaft 11 in the rear end of the shaft 10.

Facets 37 are provided on the front end of the shaft 11 to cooperate with rollers 38 in the smooth cylindrical bore 39 in the center of the flywheel 12 to provide a roller clutch between the turbine shaft 11 and the driving shaft 10, which engages when the shaft 11 turns at a higher speed and in the same direction as the shaft 10, as, for example, when the vehicle is coasting down hill, whereby to permit use of the engine as a brake. There are other rollers 40 between the reaction member 28 and sleeve 30 forming part of another over-running brake allowing rotation of the reaction member 28 in the direction of rotation of the pump impeller 25 when the turbine wheel 27 attains approximately the same speed as the pump impeller, but which otherwise prevents rotation of the reaction member 28 in the opposite direction. A bearing 28' supports the reaction member 28 for rotation on the sleeve 30.

A generally cylindrical shell 41 connected by its peripheral flange 42 to the flywheel and therefore turning with said flywheel serves to enclose the converter 26 and cooperating planetary gear set 18—22 and centrifugal clutch 16 as well as the two over-running devices at 38 and 40 so as to keep the whole assembly operating in oil under pressure for good lubrication of all of the gears and other working parts and to reduce transmission noises to a minimum. The shell 41 has a tubular hub portion 43 of reduced diameter surrounding a tubular hub portion 44 provided on the pump impeller 25. A bearing 45 supports hub 44 on the sleeve 30, and another bearing 46 supports the hub 43 on the hub 44. A seal 47 is provided between the wall 48 of the stationary housing 31 and the hub 43 to prevent leakage of oil from the rear housing chamber 49 into the flywheel housing chamber 50.

A gear 51 is suitably provided on the hub 44 meshing with a gear 52 on the driving shaft 53 of an oil pump 54 for supplying oil under pressure to the converter, only one gear 55 of the pair of gears of this pump being shown together with the face plate 56 of the pump. It will suffice to state that in the operation of the pump 54 oil is continuously delivered under pressure from the chamber 49 to the inside of the shell 41 through the sleeve 30 to keep the converter filled with operating fluid and keep the whole unit inside the shell operating in oil under pressure, as previously indicated. In view of the fact that the pump is driven by the pump impeller, it should be clear that in starting the car the oil pump will be turned with the impeller at a higher R. P. M. than the engine, but at higher car speeds the oil pump will be driven at approximately the same speed as the engine, and, therefore, an oil pump of relatively small size can be used and one requiring little power to drive.

A manually shiftable clutch collar 57 has a sliding driving connection with the hub 43 on the hub 58 thereof and is adapted to be meshed with a clutch member 59 fixed on the end of the hub 44, whereby to provide a positive driving connection between the flywheel 12 and pump impeller 25 for direct drive, the planetary gear set being locked when the collar 57 is meshed with the gear 59 to cause all of the independently rotatable elements to turn together as a unit with the flywheel. In passing, it should of course be clear that while I have shown a positive drive involving the meshing of clutching teeth, a friction clutch could be used instead for selective engagement or disengagement of the direct drive.

The clutch 16 as described in the copending application previously mentioned comprises weights 60 pivoted on pins 61 to swing outwardly under centrifugal force toward the rim of the flywheel against the action of compression springs 62 seating in holes provided therefor in the rim. Each weight has directly under but in slightly offset relation to its pivoted end a roller 63 set in a slot 64 in a shoe 65, which, in turn, is arranged to force a friction shoe 66 against the periphery 17 of the ring gear 13. The springs 67 hold the rollers 63 slightly offset in a counter-clockwise direction in relation to the pivots 61, so as not to transmit drive when the engine is turning at idling speed. However, when the weights 60 swing outwardly in the speeding up of the engine, the rollers 63 are moved in a clockwise direction against the action of the springs 67 and the shoes 66 are pressed with considerable force against the periphery 17 of the ring gear 13 to transmit drive thereto. The springs 67 allow slight movement of the rollers 63 from a retracted position at one end of the slots 64 to an operative position at the other end of the slots.

In operation, the clutch 16 remains disengaged so long as the car is standing at a curb with the engine idling, thus relieving the engine of the hydraulic drag that would otherwise be imposed thereon, such drag having caused uneven running at idling speed and a tendency for the car to creep, which sometimes necessitated holding it with the foot brake or emergency brake. To get the car under way the driver simply depresses the accelerator pedal, and as the engine speeds up the centrifugal clutch 16 engages at a predetermined speed so as to transmit drive to the ring gear 13. In that way drive is transmitted through the planetary gearing to the torque converter 26 and shaft 11 for the transmission of drive to the propeller shaft usually through drive gearing in a change speed gear box. The planetary gear set, numbered 13 and 18—22, constitutes the primary drive and the torque converter 26 the secondary drive. The primary drive exerts a substantially direct torque reaction upon the driven shaft 11 by reason of the thrust imposed through the planetary gears 19 and 20 to the sun gear 22. This reaction by virtue of the dual planetary gears 19—20 is in the same direction as the additional torque reaction imposed upon the shaft 11 by the turbine wheel 27 of the secondary drive. The turbine wheel derives its torque by the circulation of fluid by the blades of the pump impeller 25 through the blades of the turbine wheel 27 and blades of the reaction member 28. The fact that the impeller 25 turns in the same direction with the driving and driven shafts 10 and 11 avoids the necessity for any reversal in the direction of fluid flow by the blades of the reaction member 28. The stationary reaction member is, of course, responsible for torque increase, in the usual way. When the impeller and turbine wheel rotate at approximately the same speed, the converter operates substantially as a coupling, and under those conditions the reaction member 28 is arranged to overrun the rollers 40 of the freewheeling device so that it does not offer resistance to the easy turning of the converter, and hydraulic losses are therefore negligible. Close to direct drive operation the gears of the planetary set rotate as a unit and gear noise and wear are substantially eliminated and high efficiency is therefore obtained in the gear set also. Engagement of the clutch collar 57 with the gear 59 for positive direct drive locks the planetary gear set by reason of the fact that the impeller 25 is locked to the flywheel 12 and in that way the shaft 11 is positively connected to turn with the shaft 10. The fact that the sun gear 22 is carried directly on the shaft 11 and can therefore be provided of a much smaller diameter than has been possible in other transmissions of the planetary turbine type, where the sun gear was invariably provided on a sleeve surrounding the driven shaft, enables reduction in diameter of the whole planetary gear set, and transmissions designed in accordance with the present invention can accordingly be made much smaller and more compact than has heretofore been possible.

It is believed the foregoing description conveys a good understanding of the objects and advantages of my invention. The appended claims have been drawn to cover all legitimate modifications and adaptations.

I claim:

1. In a mechanical-hydraulic transmission, the combination of coaxially arranged driving and driven shafts, a planetary transmission, comprising a ring gear turning with the driving shaft, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing.

2. In a mechanical-hydraulic transmission, the combination of coaxially arranged driving and driven shafts, a planetary transmission, comprising a ring gear turning with the driving shaft, a sun gear on the driven shaft, and one or more pairs of intermeshing planetary gears independent of the driving and driven shafts interposed between the ring gear and sun gear to drive the latter, and a torque converter comprising a rotary housing on which the aforesaid planetary gears are mounted to revolve, a rotary pump impeller on said housing revolving with the planetary gears, a rotary turbine wheel mounted on and connected to the driven shaft to drive the same, and a stationary reaction member in said housing.

3. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, and a rotary outer shell on the flywheel adapted to contain a fluid lubricant suitable for the operating fluid for the converter and enclosing the converter and planetary gears.

4. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a centrifugal clutch for automatically connecting the ring gear with the flywheel when the latter attains a certain speed, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, and a rotary outer shell on the flywheel adapted to contain a fluid lubricant suitable for the operating fluid for the converter and enclosing the converter, planetary gears, and centrifugal clutch.

5. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, a stationary housing for the mechanical-hydraulic transmission having the driven shaft extending therethrough, a tubular support for the reaction member supported by said housing and surrounding the driven shaft, the converter housing having a tubular extension surrounding the tubular support and projecting into said housing, a rotary outer shell on the flywheel enclosing the converter and planetary transmission having a tubular extension surrounding the last named tubular extension and projecting into the aforesaid housing, an oil pump in said housing for delivering oil from the housing into said shell and converter, and oil seal means surrounding the tubular extension of the shell to prevent leakage of oil from the housing.

6. A transmission as set forth in claim 5, including clutch means in the stationary housing for detachably connecting the shell extension with the converter housing extension.

7. A transmission as set forth in claim 5, including a centrifugal clutch for automatically connecting the ring gear with the flywheel when the latter attains a certain speed, said clutch being enclosed in the rotary outer shell with the converter and planetary transmission.

8. A transmission comprising in combination with driving and driven elements, a turbine ring type torque converter, comprising rotatable pump impeller and turbine members and a cooperating stationary reaction member, said turbine member being connected to revolve with the driven element, a planetary type transmission mechanism, comprising a ring gear driven by the driving element, a sun gear connected to revolve with the driven element, and planetary gears connected to revolve with and transmit drive to the pump impeller and transmitting drive between the ring gear and sun gear, and clutch means for detachably connecting the pump impeller with the driving element.

9. A transmission comprising in combination with driving and driven elements, a turbine ring type torque converter, comprising rotatable pump impeller and turbine members and a cooperating stationary reaction member, said turbine member being connected to revolve with the driven element, a planetary type transmission mechanism, comprising a ring gear driven by the driving element, a sun gear connected to revolve with the driven element, and planetary gears connected to revolve with and transmit drive to the pump impeller and transmitting drive between the ring gear and sun gear, and an overrunning clutch arranged with the planetary gear train in front of the torque converter between the driving and driven elements to engage automatically in the event the driven element turns faster than the driving element.

10. A transmission comprising in combination with driving and driven elements, a turbine ring type torque converter, comprising rotatable pump impeller and turbine members and a cooperating stationary reaction member, a planetary type transmission mechanism, comprising a ring gear driven by the driving element, a sun gear connected to revolve with the driven element, and planetary gears connected to revolve with and transmit drive at increased ratio to the pump impeller and transmitting drive between the ring gear and sun gear, and an oil pump for delivering oil to the converter having a driving connection with the pump impeller of said converter, whereby the pump turns at a higher ratio than the driving element at starting and approximately at the same speed as the driving element at higher speeds when the converter operates as a fluid coupling.

11. A transmission comprising in combination with driving and driven elements, a turbine ring type torque converter, comprising rotatable pump impeller and turbine members and a cooperating reaction member, the turbine member turning with the driven element, a planetary type transmission mechanism, comprising a ring gear driven by the driving element, a sun gear connected with the turbine member to turn with the driven element, and one or more pairs of intermeshing planetary gears connected to revolve with and transmit drive to the pump impeller and transmitting drive between the ring gear and sun gear, a stationary support for the reaction member with relation to which the reaction member is rotatable, and an overrunning brake between said support and reaction member preventing rotation of the latter in one direction but permitting rotation of the reaction member in the opposite direction when the converter operates as a fluid coupling.

12. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a reaction member in said housing, a rotary outer shell on the flywheel enclosing the converter and planetary transmission, and clutch means for detachably connecting the rotary outer shell with the converter housing, whereby the converter elements and the planetary transmission elements rotate as a unit.

13. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, a stationary housing for the mechanical-hydraulic transmission having the driven shaft extending therethrough, a tubular support for the reaction member supported by said housing and surrounding the driven shaft, the converter housing having a tubular extension surrounding the tubular support and projecting into said housing, an oil pump in said stationary housing for delivering oil from the housing into said converter housing, and oil seal means between the converter and stationary housing surrounding the tubular extension of the converter housing to prevent leakage of oil from the stationary housing in the rotation of the converter with respect thereto.

14. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, a stationary housing for the mechanical-hydraulic transmission having the driven shaft extending therethrough, a tubular support for the reaction member supported by said housing and surrounding the driven shaft, the converter housing having a tubular extension surrounding the tubular support and projecting into said housing, a rotary outer shell on the flywheel enclosing the converter and planetary transmission having a tubular extension surrounding the last named tubular extension and projecting into the aforesaid housing, and clutch means in the stationary housing for detachably connecting the shell extension with the converter housing extension.

15. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, a stationary tubular support for the reaction member surrounding the turbine shaft, the converter housing having a tubular extension surrounding the tubular support, a rotary outer shell on the flywheel enclosing the converter and planetary transmission having a tubular extension surrounding the last named tubular extension, and clutch means for detachably connecting the shell extension with the converter housing extension.

16. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a stationary reaction member in said housing, a stationary tubular support for the reaction member surrounding the driven shaft, the converter housing having a tubular extension surrounding the tubular support, and an oil pump driven by the converter housing extension for delivering oil from a source of oil supply into said converter housing.

17. A transmission as set forth in claim 16, including a rotary outer shell on the flywheel enclosing the converter and planetary gears and having a tubular extension surrounding the converter housing extension, said shell being adapted also to be supplied with oil from said pump, and clutch means for detachably connecting the shell extension with the converter housing extension.

18. In a mechanical-hydraulic transmission, the combination of coaxially arranged driving and driven shafts, a flywheel on the driving shaft, a planetary transmission, comprising a ring gear turning with the flywheel, a sun gear on the driven shaft, and planetary gears independent of the driving and driven shafts interposed between the ring gear and sun gear to drive the latter, a torque converter comprising a rotary housing on which the aforesaid planetary gears are mounted to revolve, a rotary pump impeller turning with said housing, a rotary turbine wheel mounted on and connected to the driven shaft to drive the same, and a reaction member in said housing, a stationary tubular support for the reaction member surrounding the driven shaft, an overrunning brake between said support and reaction member preventing rotation of the latter in one direction but permitting rotation in the opposite direction when the converter operates as a fluid coupling, a rotary outer shell on the flywheel enclosing the converter and planetary transmission, and clutch means for detachably connecting the rotary outer shell with the converter housing, whereby the converter elements and the planetary transmission elements rotate as a unit.

ADOLF G. SCHNEIDER.